(12) United States Patent
Picard et al.

(10) Patent No.: US 7,208,440 B2
(45) Date of Patent: Apr. 24, 2007

(54) METHOD FOR PRETREATMENT OF CATALYSTS WITH A PHOSPHORIC ACID BASE

(75) Inventors: Florent Picard, Saint Symphorien D'Ozon (FR); Julia Magne-Drisch, Vilette de Vienne (FR); Alain Forestiere, Vernaison (FR); Aurélien Hainault, Lyons (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 10/962,569

(22) Filed: Oct. 13, 2004

(65) Prior Publication Data

US 2005/0079974 A1 Apr. 14, 2005

(30) Foreign Application Priority Data

Oct. 13, 2003 (FR) .................................. 03 12010

(51) Int. Cl.
- *B01J 20/34* (2006.01)
- *B01J 38/56* (2006.01)
- *C07C 2/02* (2006.01)
- *C07C 2/64* (2006.01)
- *C07C 15/067* (2006.01)

(52) U.S. Cl. .................. 502/208; 502/31; 585/446; 585/529

(58) Field of Classification Search .............. 502/208, 502/31; 585/446, 529, 709
See application file for complete search history.

(56) References Cited

U.S. PATENT DOCUMENTS

| | | | | |
|---|---|---|---|---|
| 2,347,955 A * | 5/1944 | Korpi | .................... | 502/184 |
| 2,586,852 A * | 2/1952 | Morrell | .................... | 502/81 |
| 2,626,290 A * | 1/1953 | Fell et al. | .................... | 585/529 |
| 2,650,201 A * | 8/1953 | Mavity | .................... | 502/214 |
| 2,778,804 A * | 1/1957 | Corner et al. | .................... | 502/213 |
| 2,833,727 A * | 5/1958 | Mavity et al. | .................... | 502/214 |
| 2,871,199 A * | 1/1959 | Bielawski | .................... | 502/214 |
| 2,913,506 A | 11/1959 | Engel | | |
| 3,112,350 A * | 11/1963 | Bielawski et al. | .................... | 585/529 |
| 3,651,168 A | 3/1972 | Stoessel et al. | | |
| 3,673,111 A * | 6/1972 | Hovarth et al. | .................... | 502/213 |
| 3,758,627 A * | 9/1973 | Juguin et al. | .................... | 585/514 |
| 3,844,932 A * | 10/1974 | Gomi et al. | .................... | 208/57 |
| 4,058,575 A * | 11/1977 | Cahn et al. | .................... | 585/374 |
| 4,456,780 A * | 6/1984 | Young | .................... | 585/475 |
| 5,955,641 A * | 9/1999 | Chen et al. | .................... | 585/320 |
| 6,040,257 A * | 3/2000 | Drake et al. | .................... | 502/64 |
| 6,313,363 B1 * | 11/2001 | Joly et al. | .................... | 585/480 |
| 6,472,569 B1 * | 10/2002 | Wu et al. | .................... | 568/698 |
| 2004/0220437 A1 * | 11/2004 | Jothimurugesan et al. | .. | 585/300 |

FOREIGN PATENT DOCUMENTS

| | | |
|---|---|---|
| EP | 0 371 938 | 6/1990 |
| EP | 1 118 651 | * 7/2001 |
| FR | 1167820 | 12/1958 |
| FR | 2000080 | 8/1969 |

* cited by examiner

*Primary Examiner*—J. A. Lorengo
*Assistant Examiner*—Patricia L. Hailey
(74) *Attorney, Agent, or Firm*—Millen, White, Zelano & Branigan, P.C.

(57) ABSTRACT

The invention relates to a method for pretreatment of a solid catalyst that is obtained by a reaction between an inorganic binder and phosphoric acid, whereby said method comprises a stage in which said catalyst is brought into contact with a mixture of hydrocarbons under swelling conditions of the catalyst up to a predetermined volume increase, with no significant volume constraint on said catalyst. The invention also relates to an operating process of said catalyst in an alkylation or oligomerization reactor.

35 Claims, No Drawings

METHOD FOR PRETREATMENT OF CATALYSTS WITH A PHOSPHORIC ACID BASE

This invention relates to the field of catalysts with a phosphoric acid base and to their method of pretreatment and use. This invention finds its application in, for example, the conversion of hydrocarbons and more particularly in the processes for alkylation of aromatic compounds, alkylation of sulfur-containing compounds that are present in a gasoline fraction, for production of liquid hydrocarbons from gaseous olefins or for the production of long olefins that are branched by the oligomerization of olefins.

The solid catalysts with a phosphoric acid base are used industrially in various hydrocarbon conversion processes. These catalysts are prepared in general by reacting phosphoric acid on an inorganic substrate such as silica. The product that is thus obtained is then most often shaped by extrusion and then calcined so as to obtain a solid catalyst. The preparation of such catalysts is described in detail in Patents U.S. Pat. No. 2,586,852, U.S. Pat. No. 2,650,201, U.S. Pat. No. 2,833,727, U.S. Pat. No. 2,871,199, and U.S. Pat. No. 3,112,350.

It is known that in such catalysts, the phosphoric acid is found primarily in orthosilicophosphate ($Si_3PO_4$) and pyrosilicophosphate ($SiP_2O_7$) form. The amounts of orthosilicophosphate and pyrosilicophosphate depend on operating conditions of the preparation of the catalyst and in particular the hydration rate during the calcination/drying phase.

The catalysts with a phosphoric acid base are used industrially for alkylation reactions by olefins. The reaction process involves the formation of a carbocation from an olefin. The primary applications are the alkylation of aromatic compounds by olefins and more particularly the production of cumene by the addition of propylene to benzene and the production of long olefins that are branched by oligomerization of olefins with 3 or 4 carbon atoms. Among the other possible applications, the alkylation of the thiophenic compounds by the olefins that is intended to increase the weight of these compounds and to produce a desulfurized gasoline by separation of these heavy sulfur-containing compounds that are thus formed by distillation is cited. Such an application is described in particular in patent U.S. Pat. No. 5,599,441.

It is known that the use of such catalysts in such reactions poses problems, however. Thus, the catalyst that is used in these olefinic fractions has a tendency to see its volume increase during the reaction. This expansion is accompanied by a very significant reduction of the activity of the catalyst at the end of several days, and even several hours of use. This effect is often attributed to an instability of the catalyst that could also be reflected by a collapsing phenomenon of the structure of catalyst grains.

Such problems are described in, for example, patent U.S. Pat. No. 5,043,509. According to this teaching, the swelling of the catalyst also brings about a clogging of the reactor and an increase in the loss of load of the catalytic bed by significant reduction of the void rate of the catalytic bed, and even a destruction of the structure of the catalyst grains. To solve these problems, a method that consists in using catalysts whose ratio of outside surface area to volume is increased, so as to significantly increase the void fraction in the reactor, is proposed in patent U.S. Pat. No. 5,043,509.

According to Patent EP 447 705, it is possible to improve the stability of the catalysts with a phosphoric acid base by preparing catalysts wherein the number of pores whose diameter is greater than 1000 nm and the pore volume are limited.

In these two cases, the final cost of the catalyst that is used is then greatly increased, which impairs the overall economic profitability of the process.

Contrary to the processes of the prior art, this invention makes it possible to limit in a simple and economical manner the cost of the employment of catalysts with a phosphoric acid base while maintaining an acceptable level of activity of these catalysts over time.

More particularly, this invention relates to a method for pretreatment of a solid catalyst that is obtained by a reaction between an inorganic binder and phosphoric acid, whereby said method comprises a stage in which said catalyst is brought into contact with a mixture of hydrocarbons under conditions of swelling or expansion of the catalyst up to a predetermined volume increase, with no significant volume constraint on said catalyst.

The pretreatment method according to the invention is applied to solid catalysts that are known from the prior art, prepared by reacting phosphoric acid and an inorganic binder as described in the patents that are cited above (U.S. Pat. No. 2,586,852, U.S. Pat. No. 2,650,201, U.S. Pat. No. 2,833,727, U.S. Pat. No. 2,871,199, and U.S. Pat. No. 3,112,350).

In general, said volume increase is between 5% and 60%, advantageously between 10% and 40%, very advantageously between 19 and 35%, and even more advantageously between 25 and 33% relative to the initial volume of the catalyst.

Said hydrocarbon mixture advantageously comprises at least 2% by weight of olefins, preferably at least 5% by weight of olefins and very preferably at least 10% by weight of olefins.

Said hydrocarbon mixture generally comprises less than 50 ppm by weight of nitrogen, preferably less than 20 ppm by weight of nitrogen, and even less than 10 ppm by weight of nitrogen. The hydrocarbon mixture preferably typically contains less than 1000 ppm by weight of basic sulfur-containing compounds. Basic sulfur-containing compounds are defined as sulfides, tetrahydrothiophenes and thiophenic compounds.

The water content of the hydrocarbon mixture generally does not exceed 300 ppm by weight of water, and preferably it is less than 150 ppm by weight of water.

If these specifications are not achieved, the hydrocarbon mixture can be pretreated so as to extract excess nitrogen-containing and sulfur-containing compounds. The pretreatments can consist of, for the nitrogen-containing compounds, an extraction by an aqueous washing, a treatment on a guard bed or a hydrogen treatment on a hydrodenitration catalyst and, for the sulfur-containing compounds, by a treatment on a guard bed or a treatment with hydrogen on a hydrodesulfurization catalyst.

The mixture of hydrocarbons advantageously comprises or consists of at least one gasoline fraction that is selected from among the atmospheric distillation gasolines, the gasolines that are obtained from catalytic cracking units, the gasolines that are obtained from reforming units, and, more generally, the conversion gasolines or a mixture of said gasolines.

Said contact is carried out at a temperature of, for example, between 20 and 250° C., preferably between 30° C. and 200° C., and even more preferably between 120 and 170° C., and the contact time can be between 2 hours and 100 hours, preferably between 4 hours and 50 hours, and even more preferably between 35 and 50 hours, whereby the pressure of this operation is calculated such that the hydrocarbon mixture is in a liquid state.

The invention also relates to a process for using a solid catalyst that is obtained by a reaction between an inorganic binder and phosphoric acid, whereby said process comprises a pretreatment stage according to the method described above, followed by a stage for employing the catalyst in an alkylation or oligomerization reactor.

According to a first embodiment, the pretreatment stage of the catalyst can be carried out directly in the reactor, whereby a first fraction of the catalyst is introduced and kept in contact with the hydrocarbon mixture for an adequate period to achieve the predetermined volume increase of the catalyst, whereby a second fraction is then introduced, and then kept in contact with the hydrocarbon mixture, whereby the preceding operations are repeated until the reactor is completely charged.

According to another possible embodiment, the pretreatment stage of the catalyst can be carried out outside of the reactor, whereby the catalyst that has undergone the pretreatment stage is then transferred into the reactor.

According to an advantageous method, the hydrocarbon mixture is injected after having been heated to a temperature of between 20° C. and 250° C., preferably between 30° C. and 200° C., whereby the pressure that is applied is adequate for keeping the hydrocarbon mixture in the liquid phase.

This method and/or this process pertains particularly well to processes for alkylation of aromatic compounds, for the production of liquid hydrocarbons from gaseous olefins, and for alkylation of sulfur-containing compounds that are present in a gasoline fraction.

In a more detailed way, the invention consists in bringing into contact the fresh catalyst, i.e., newly synthesized by means of phosphoric acid and an organic binder, with a hydrocarbon mixture whose composition is adjusted so as to produce a controlled swelling of the catalyst. This contact is carried out in the absence of any significant volume constraint. Significant absence of constraint is defined as the expansion being carried out apart from any confinement of the catalyst that could restrict said expansion, i.e., the expansion of the catalyst should be able to be done with no constraint in at least one direction of the space. When the catalyst has reached the desired volume increase, the hydrocarbon mixture is purged. The reactor can then be started conventionally. It was found, astonishingly enough, that the catalyst that has undergone a preliminary expansion with no constraint in at least one direction of the space exhibits an improved activity over time.

According to a first embodiment of the invention, the contact between the fresh catalyst and the hydrocarbon mixture is carried out directly in the reactor. The reactor is filled with the hydrocarbon mixture in an amount such that after the catalyst is introduced, there is no overflow of liquid. A first fraction of the catalyst is then introduced. In this stage, it is necessary to wait for an adequate period to reach the degree of expansion of the catalyst. This period shall be determined by the nature of the hydrocarbon mixture as well as the desired degree of expansion. When the catalyst has swelled as desired with no constraint, a second fraction can be introduced. The operation is repeated until the reactor is completely charged. Filling in a reactor that is kept hot and under pressure can also be carried out by using a sieve to introduce the catalyst under the temperature and pressure conditions of the hydrocarbon mixture.

According to a second embodiment of the invention, the expansion is carried out in a separate capacity of the reactor that can be nitrogen-pressurized, for example. The catalyst is brought into contact with the hydrocarbon mixture. When the desired degree of swelling is achieved, the catalyst as well as the mixture of hydrocarbons are transferred by overpressure into the reactor. If the capacity in which the expansion is used is not a volume that is greater than or equal to the volume of the reactor, the charging can be carried out several times. In this case, the mixture of hydrocarbons in contact with the catalyst in the reactor is purged so as not to produce an excessive swelling of the catalyst grains. This embodiment offers the advantage of better controlling the contact time between the mixture of hydrocarbons and the fresh catalyst.

According to this method, the catalyst can advantageously be brought into contact with the flow of the hydrocarbon mixture that is continuously injected after the latter has been heated. In this case, the expansion of the catalyst is accelerated. In this case, the applied pressure should be adequate to keep the hydrocarbon mixture in the liquid phase.

Of course, this invention is not limited to the preceding methods, given by way of illustrative and non-limiting example.

The invention can be better understood from reading the following examples, it being understood that these examples in no way limit the extent of this invention.

EXAMPLE 1

The degree of swelling of a fresh commercial catalyst with a phosphoric acid base in various hydrocarbon mixtures was measured. The selected commercial catalyst is marketed by the Süd Chemie Company under reference C84-5-01. For this purpose, about 50 cm$^3$ of catalyst was placed in an autoclave. 250 cm$^3$ of various hydrocarbon mixtures was poured on the catalyst. The autoclave is then brought to 160° C. and to a pressure of 20 bar (2 MPa) and left for 48 hours under these conditions. At the end of the time, the liquid is purged, and the catalyst is recovered. The degree of swelling of the catalyst is measured by optical analysis, i.e., a photograph of a catalyst sample was taken, and the dimensions of the catalyst grains were measured.

The material for analysis of images consists of:
- a camera of COHU brand, series 4910 of CCIR type (1992), with 752 (H)×582 (V) sensors, equipped with a GMZ-type macro zoom, with an 18–108 mm focus and a 2.5 opening. The unit is supported by a height-adjustable bracket.
- A 15×20 cm light table (the lighting is done by optical fiber transmission from a light source of the Dolan-Jenner brand, with a 20V-150W halogen bulb).
- An X-Y motorized plate of Prior brand, type H105, with 153×153 mm of travel, with a precision of ±8 μm and a repeatability of ±2 μm.
- A 25 frame/second video capture card, of the Matrix Vision brand, of the MV delta type with PCI bus.
- Software for control of the "Stage-Pro" motorized plate.

The processing of the images obtained by the above-described installation was carried out with software for acquisitions and processing of images "Image Pro Plus" that was developed by the Media-Cybernetics Company and sold by the BFI-Optilas Company.

Table 1 illustrates the degrees of swelling obtained based on operating conditions and the type of hydrocarbon mixture tested. The results correspond to an average value that is obtained from measurements made on one hundred extrudates.

TABLE 1

| Hydrocarbon Mixture | n-Heptane | Gasoline Obtained from Atmospheric Distillation | Gasoline Obtained from a Reforming Unit | Gasoline Obtained from a Fluidized-Bed Cracking Unit (FCC) |
|---|---|---|---|---|
| Olefin Content in the Mixture (% by Weight) | 0 | 0 | 0 | 38 |
| Swelling at 25° C. (% Initial Volume) | 2 | 3 | 3 | 19 |
| Swelling at 160° C. (% Initial Volume) | 2 | 5 | 2 | 32 |

The degrees of swelling measured based on the olefin content of the hydrocarbon mixture show that a significant swelling is observed in general when the hydrocarbon mixture contains an olefinic fraction. In this case, the observed swelling is more significant at a temperature of 160° C. than at a temperature of 25° C.

EXAMPLE 2

A volume of 50 cm$^3$ of catalyst that is identical to the commercial catalyst that is identical to that of Example 1 but not treated according to the invention is placed in a fixed-bed reactor of a pilot unit A. A volume of 50 cm$^3$ of the same catalyst is treated according to the procedure of Example 1 by contact under the above-described conditions with an FCC gasoline for 48 hours at 160° C. at a pressure of 20 bar (2 MPa). The thus prepared catalyst exhibits a volume increase on the order of 30% relative to its initial volume and is placed in a fixed-bed reactor of a pilot unit B that is identical to unit A. The two reactors are heated to 160° C. and fed by the same n-heptane mixture and 150 ppm by weight of water, produced in situ by dehydration of isopropanol, for 48 hours under a pressure of 2 MPa. The reactors are then fed by a synthetic gasoline that contains 70% by weight of n-heptane and 30% by weight of methyl-pentene by maintaining the same operating conditions. The catalytic activity is measured by the conversion rate of methyl-pentene for pilot units A and B. Periodic analyses make it possible to follow the evolution of the catalytic activity based on time. Table 2 exhibits the evolution of the disappearance of methylbutenes based on a relative time that is normalized to 100.

It is noted that the catalytic activity that is measured on unit B that uses the catalyst that underwent a prior treatment according to the invention exhibits a more stable catalytic activity over time than the one that is measured in reactor A, comprising the catalyst that has not undergone the previous swelling stage.

TABLE 2

| | Relative time | | | | | | | |
|---|---|---|---|---|---|---|---|---|
| | 2 | 20 | 30 | 35 | 50 | 78 | 88 | 100 |
| Unit A Olefin Conversion (%) | 68 | 61 | 54 | 48 | 45 | 35 | 40 | 21 |
| Unit B Olefin Conversion (%) | 62 | 58 | 58 | 58 | 52 | 48 | 48 | 48 |

The invention claimed is:

1. A method for pretreatment of fresh solid catalyst having an initial volume obtained by a reaction between an inorganic binder and phosphoric acid, said method comprising:
    providing a vessel of a predetermined volume;
    adding a liquid hydrocarbon mixture to said vessel;
    immersing into said vessel an amount of fresh catalyst having a volume less than the predetermined volume of said vessel;
    maintaining the immersed catalyst for a sufficient time and temperature to swell the catalyst to a predetermined volume increase between 5 and 60%, relative to said initial volume, with no significant volume constraint on said catalyst, thereby permitting a volumemetric expansion of said catalyst in at least one direction;
    said hydrocarbon mixture comprising at least 10% by weight of olefins and comprising at least one gasoline selected from the group consisting of atmospheric distillation gasolines, gasolines obtained from catalytic cracking units, and gasolines obtained from reforming units, and mixtures of said gasolines.

2. A method according to claim 1, in which said hydrocarbon mixture comprises less than 50 ppm by weight of nitrogen, less than 1000 ppm by weight of basic sulfur-containing compounds and less than 150 ppm by weight of water.

3. A method according to claim 1, in which said contact is carried out at a temperature of between 20 and 250° C., in which the immersion time is between 2 hours and 100 hours and in which the pressure is maintained to ensure that the hydrocarbon mixture is liquid.

4. A method according to claim 3, wherein the temperature is between 30 and 20° C.

5. A method according to claim 3, wherein the temperature is between 120 and 170° C.

6. A method according to claim 5, wherein the immersion time is between 4 and 50 hours.

7. A method according to claim 5, wherein the immersion time is between 35 and 50 hours.

8. A method according to claim 7, wherein said volume increase is between 10% and 40% relative to the initial volume of the catalyst.

9. A method according to claim 7, wherein said volume increase is between 19% and 35% relative to the initial volume of the catalyst.

10. A method according to claim 7, wherein said volume increase is between 25% and 33% relative to the initial volume of the catalyst.

11. A method according to claim 3, wherein the immersion time is between 4 and 50 hours.

12. A method according to claim 3, wherein the immersion time is between 35 and 50 hours.

13. A method according to claim 1, wherein the pretreatment is followed by an operating stage of the catalyst in an alkylation or oligomerization fixed bed reactor.

14. A process according to claim 13, in which the stage for pretreatment of the catalyst is carried out directly in the reactor, whereby a first fraction of the catalyst is introduced and kept in contact with the hydrocarbon mixture for an adequate period to reach the predetermined catalyst volume increase, a second fraction then being introduced and then kept in contact with the hydrocarbon mixture, whereby the preceding operations are repeated until a charging of the reactor is completed.

15. A process according to claim 13, in which the hydrocarbon mixture is injected after having been heated to a temperature of between 200° C. and 2500° C., whereby the applied pressure is adequate to keep the hydrocarbon mixture in liquid phase.

16. A process according to claim 13, in which the pretreatment of the catalyst is carried out outside of a reactor, and after the catalyst has undergone the pretreatment stage is then transferred into the reactor.

17. A process according to claim 1, in which the stage for pretreatment of the catalyst is carried out outside of a reactor, whereby the catalyst has undergone the pretreatment stage and then is transferred into the reactor.

18. In a catalytic process for alkylation of aromatic compounds, for production of liquid hydrocarbons from gaseous olefins or alkylation of sulfur-containing compounds that are present in a gasoline fraction, the improvement wherein the catalyst is prepared according to the process of claim 17.

19. In a catalytic process for alkylation of aromatic compounds, for production of liquid hydrocarbons from gaseous olefins or alkylation of sulfur-containing compounds that are present in a gasoline fraction, the improvement wherein the catalyst is pretreated according to the method of claim 1.

20. A method according to claim 1, wherein said volume increase is between 10% and 40% relative to the initial volume of the catalyst.

21. A method according to claim 1, wherein said volume increase is between 19% and 35% relative to the initial volume of the catalyst.

22. A method according to claim 1, wherein said volume increase is between 25% and 33% relative to the initial volume of the catalyst.

23. A method according to claim 1, in which said hydrocarbon mixture comprises less than 50 ppm by weight of nitrogen, less than 1000 ppm by weight of basic sulfur-containing compounds less than 150 ppm by weight of water and at least 2% by weight of olefins.

24. A method according to claim 23, wherein said volume increase is between 10% and 40% relative to the initial volume of the catalyst.

25. A method according to claim 23, wherein said volume increase is between 19% and 35% relative to the initial volume of the catalyst.

26. A method according to claim 23, wherein said volume increase is between 25% and 33% relative to the initial volume of the catalyst.

27. A method according to claim 1, wherein the immersion time is between 35 and 50 hours.

28. A process according to claim 1, in which the pretreatment of the catalyst is carried out directly in the reactor, wherein a first fraction of the catalyst is introduced and kept in contact with the hydrocarbon mixture for an adequate period to reach the predetermined catalyst volume increase, a second fraction then being introduced and then kept in contact with the hydrocarbon mixture, and the preceding operations are repeated until the desired charging of the reactor is completed.

29. A method according to claim 1, further comprising: after the swelling of the catalyst, purging the liquid hydrocarbon mixture from the vessel; locating the resultant swollen catalyst in a reactor; and conducting a reaction in said reactor.

30. A process according to claim 29, wherein said reaction is an alkylation reaction.

31. A method according to claim 1, wherein said inorganic binder comprises silica, resulting in a reaction product comprising $Si_3PO_4$ and $SiP_2O_7$.

32. A method according to claim 1, wherein said liquid hydrocarbon mixture initially comprises at least 1000 ppm by weight of basic sulfur containing compounds, and prior to said swelling step, lowering the content of said basic sulfur containing compounds tot less than 1000 ppm by weight.

33. A method according to claim 1, wherein said swelling step is conducted prior to employing said catalyst in a reaction.

34. A method according to claim 1, wherein the amount of liquid hydrocarbon mixture passed into the vessel is such that when the catalyst is immersed in said mixture, that the liquid hydrocarbon mixture does not overflow the vessel.

35. A method for pretreatment of a fresh solid catalyst having an initial volume obtained by a reaction between a inorganic binder and phosphoric acid, said method comprising contacting said catalyst with a liquid hydrocarbon mixture under swelling conditions to allow the catalyst to swell up to a predetermined increase between 10% and 40% relative to the initial volume of the initial catalyst, with no significant volume constraint on said catalyst thereby permitting the catalyst to expand in at least one direction apart from any confinement of the catalyst that would restrict said expansion.

* * * * *

UNITED STATES PATENT AND TRADEMARK OFFICE
CERTIFICATE OF CORRECTION

PATENT NO. : 7,208,440 B2  
APPLICATION NO. : 10/962569  
DATED : April 24, 2007  
INVENTOR(S) : Florent Picard It is certified that error appears in the above-identified patent and that said Letters Patent is hereby corrected as shown below:

Column 6, line 47 reads "20", should read -- 200 --  
Column 7, line 15 reads "200", should read -- 20 --  
Column 7, line 15 reads "2500", should read -- 250 --

Signed and Sealed this

Twenty-seventh Day of November, 2007

JON W. DUDAS  
*Director of the United States Patent and Trademark Office*